D. H. WILSON.
TELEPHONE REPEATER.
APPLICATION FILED JUNE 13, 1911.
1,059,690.
Patented Apr. 22, 1913.
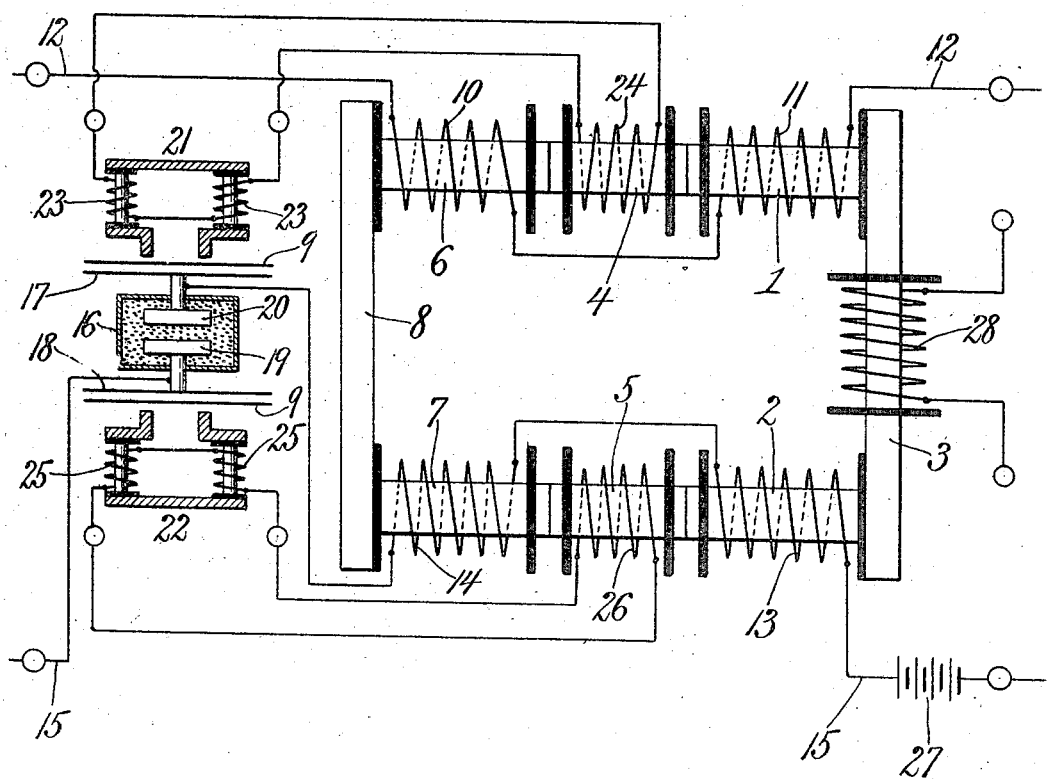

UNITED STATES PATENT OFFICE.

DAVID H. WILSON, OF NEW YORK, N. Y., ASSIGNOR, BY MESNE ASSIGNMENTS, TO DAVID H. WILSON AND ROBERT BINES, TRUSTEES, OF NEW YORK, N. Y.

TELEPHONE-REPEATER.

1,059,690.

Specification of Letters Patent.   Patented Apr. 22, 1913.

Application filed June 13, 1911.   Serial No. 632,351.

*To all whom it may concern:*

Be it known that I, DAVID H. WILSON, a citizen of the United States, residing at New York, in the county of New York and State of New York, have invented a certain new and useful Improvement in Telephone-Repeaters, of which the following is a specification.

This invention relates to telephone repeaters, and has for its object to provide a new and improved device of this description.

The invention is illustrated in the accompanying drawing, wherein there is shown diagrammatically a repeater embodying the invention.

The present device is particularly adapted to be used in connection with a charged line, central energy system.

Referring now to the drawing, the repeater is provided with a core consisting of the end sections 1 and 2 connected by the connecting piece 3, the parts forming a U-shaped end portion. There are two intermediate sections 4 and 5 and two end sections 6 and 7, the end sections connected together by the connecting piece 8 so as to form a U-shaped end portion. The sections 1 and 6 are provided with coils 10 and 11 which are connected in one branch 12 of the main line. The sections 2 and 7 are provided with coils 13 and 14 connected in the other branch 15 of the main line. Connected with the coils 13 and 14 and in the main line 15 is a transmitter 16. This transmitter is provided with two diaphragms 17 and 18, said diaphragms being connected with the electrodes 19 and 20. Associated with the transmitter 16 are two receivers 21 and 22 having diaphragms 9. The receiver 21 is provided with the coils 23 which are connected in circuit with the coil 24 on the intermediate section 4 of the core. The receiver 22 is provided with the coils 25 which are connected in circuit with the coil 26 on the intermediate section 5 of the core. A source of electric supply 27 is connected in the main line circuit.

In the operation of the device the talking current comes in over the main line, passes through the coils 13 and 14 and the transmitter 16 and to the distant point, then back through the coils 10 and 11. The talking current in the coils 10, 11, 13 and 14 produces a talking current in the coils 24 and 26. The talking currents in these coils then act through the receivers 21 and 22 upon the transmitter diaphragms 17 and 18, and, since the main line is a charged line, the talking current therein will be reinforced. This device, it will therefore be seen, balances the line and reinforces the current in the line by automatically producing additional sound waves therein.

On the connecting piece 3 there is provided a coil 28 to be used in connection with a listening key.

I claim:

1. A repeater comprising a core divided into sections, some of said sections provided with coils connected in the main line, a transmitter and a source of electric supply in circuit with said coils, separated coils on other of said sections, and receivers in circuit therewith, said receivers associated with said transmittter so as to actuate the same when a talking current is traversing the main line.

2. A repeater comprising a core having two U-shaped end sections and two intermediate sections, a coil on each of the branches of the U-shaped sections, said coils all connected in the main line circuit, a transmitter and a source of electric supply in circuit with said coils, a coil on each of said intermediate sections electrically disconnected from the main line circuit, a receiver connected in circuit with each of said latter coils, said receivers associated with said transmitter so as to actuate the same.

3. A repeater comprising two cores substantially parallel to each other, each divided into three sections, the sections of the two cores at each end being magnetically connected, a single coil upon each of the end sections, said coils connected in the main circuit, a single coil upon each of the intermediate sections, a receiver connected in circuit with each of said latter coils, a transmitter in the main line provided with two diaphragms, said receivers opposed to the diaphragms of said transmitter.

4. A telephone repeater comprising a plurality of coils adapted to be connected in the main line, a transmitter in circuit with said coils, a receiver associated with said transmitter so as to actuate the same, and a coil associated with said first mentioned coils and connected in circuit with said receiver.

5. A telephone repeater comprising a plurality of coils adapted to be connected in the main line, a transmitter connected in circuit with said coils, two diaphragms connected with said transmitter, two receivers, one associated with each of said diaphragms so that said diaphragms are simultaneously actuated when the receivers are actuated, and means associated with said main line coils for actuating said receivers.

Signed at Chicago, Illinois, this 25th day of May, A. D. 1911.

DAVID H. WILSON.

Witnesses:
 MINNIE M. LINDENAU,
 EDNA K. REYNOLDS.